(12) United States Patent
Lee

(10) Patent No.: US 12,026,393 B2
(45) Date of Patent: Jul. 2, 2024

(54) APPARATUS AND METHOD FOR SELECTING STORAGE LOCATION BASED ON DATA USAGE

(71) Applicant: ELECTRONICS AND TELECOMMUNICATIONS RESEARCH INSTITUTE, Daejeon (KR)

(72) Inventor: Yongseob Lee, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 17/550,671

(22) Filed: Dec. 14, 2021

(65) Prior Publication Data
US 2022/0197544 A1    Jun. 23, 2022

(30) Foreign Application Priority Data

Dec. 17, 2020   (KR) ........................ 10-2020-0177684
Nov. 30, 2021   (KR) ........................ 10-2021-0168208

(51) Int. Cl.
*G06F 3/06*    (2006.01)
*G06N 20/00*   (2019.01)

(52) U.S. Cl.
CPC .......... *G06F 3/0655* (2013.01); *G06F 3/0604* (2013.01); *G06F 3/0673* (2013.01); *G06N 20/00* (2019.01)

(58) Field of Classification Search
CPC .... G06F 3/0655; G06F 3/0604; G06F 3/0673; G06F 3/0631; G06F 3/0685; G06N 20/00
See application file for complete search history.

(56) References Cited

U.S. PATENT DOCUMENTS 9,857,980 B2    1/2018   Liu et al.
10,496,306 B1 * 12/2019  Srivastava ............ G06F 3/0631
(Continued)

FOREIGN PATENT DOCUMENTS

KR   10-2014-0033099   3/2014
KR   10-2014-0061218   5/2014
(Continued)

OTHER PUBLICATIONS

Lei Liu et al., "Hierarchical Hybrid Memory Management in OS for Tiered Memory Systems", IEEE Transactions On Parallel and Distributed Systems, Oct. 2019, pp. 2223-2236, vol. 30, No. 10.
(Continued)

*Primary Examiner* — Masud K Khan
(74) *Attorney, Agent, or Firm* — KILE PARK REED & HOUTTEMAN PLLC

(57) ABSTRACT

Disclosed herein are an apparatus and a method for selecting a storage location based on data usage. The apparatus for selecting a storage location based on data usage includes memory for storing at least one program, and a processor for executing the program, wherein the program is configured to, when an instruction for predetermined data is input through a user interface, determine one of multiple storage devices based on a result of analysis of usage of the predetermined data, and perform a process corresponding to the instruction by writing the predetermined data to the determined storage device or by reading the predetermined data from the determined storage device, and, wherein the multiple storage devices comprise at least two of multiple different types of permanent storage devices and multiple different types of volatile storage devices.

16 Claims, 8 Drawing Sheets

(56) References Cited

U.S. PATENT DOCUMENTS

| | | | |
|---|---|---|---|
| 10,680,932 B1* | 6/2020 | Colgrove | G06F 11/1471 |
| 2012/0317337 A1 | 12/2012 | Johar et al. | |
| 2016/0110107 A1 | 4/2016 | Zhang et al. | |
| 2017/0255690 A1 | 9/2017 | Chau et al. | |
| 2019/0102085 A1* | 4/2019 | Yang | G06F 3/061 |
| 2019/0319859 A1* | 10/2019 | Casey | H04L 41/5051 |
| 2020/0125277 A1* | 4/2020 | Greco | G06F 3/0659 |
| 2020/0341656 A1* | 10/2020 | Chawla | G06F 16/9027 |
| 2020/0341673 A1* | 10/2020 | Iyer | G06F 12/109 |
| 2021/0263892 A1 | 8/2021 | Subramanian et al. | |

FOREIGN PATENT DOCUMENTS

| | | |
|---|---|---|
| KR | 10-2015-0120027 | 10/2015 |
| KR | 10-2017-0102725 | 9/2017 |

OTHER PUBLICATIONS

Chenxi Wang et al., "Panthera: Holistic Memory Management for Big Data Processing over Hybrid Memories", PLDI 19, Jun. 22-26, 2019, pp. 347-362.

* cited by examiner

APPARATUS AND METHOD FOR SELECTING STORAGE LOCATION BASED ON DATA USAGE

CROSS REFERENCE TO RELATED APPLICATIONS

This application claims the benefit of Korean Patent Application Nos. 10-2020-0177684, filed Dec. 17, 2020 and 10-2021-0168208, filed Nov. 30, 2021, which are hereby incorporated by reference in their entireties into this application.

BACKGROUND OF THE INVENTION

1. Technical Field

The following embodiments relate to technology for selecting a data storage location in a system including multiple various types of storage devices.

2. Description of the Related Art

Storage devices for storing data have been diversified, and such storage devices may be mainly classified into a non-volatile (permanent) storage device that can be indefinitely reused because data can be stored and retained regardless of whether power is supplied or interrupted, and a volatile storage device in which stored data is lost when the supply of power is interrupted.

Therefore, with regard to data desired to be reused through direct intervention even if the supply of power is interrupted, a permanent storage device may be selected to store the corresponding data. On the other hand, with regard to data that does not need to be restored even if the supply of power is interrupted, a volatile storage device may be selected to store the corresponding data. Alternatively, when both fast processing and permanent storage are simultaneously required, a volatile storage device enabling fast processing may be temporarily used, while a permanent storage device may be finally used to store data.

In addition, recently, a storage device that can be used in the same manner as Dynamic Random Access Memory (DRAM) and that is capable of permanently storing data thereon has been commercialized. Due thereto, a volatile storage device and a nonvolatile storage device can be used based on the same interface as DRAM. However, in order to permanently store data, selection of a storage location by a user is still required.

Meanwhile, the amount of new types of data and processed data is rapidly increasing, and utilization thereof has diversified. However, as described above, to date, the user personally selects a storage device in which to store data, and thus selection of a storage device suitable for data usage becomes more and more difficult. In this situation, unless selection of a suitable storage location is performed, loss in the performance of a system may occur.

SUMMARY OF THE INVENTION

An embodiment is intended to increase data usage efficiency and improve processing performance by automatically selecting storage devices having various types of performance characteristics so as to suit data usage without a user's manual intervention.

In accordance with an aspect, there is provided an apparatus for selecting a storage location based on data usage, including memory for storing at least one program, and a processor for executing the program, wherein the program is configured to, when an instruction for predetermined data is input through a user interface, determine one of multiple storage devices based on a result of analysis of usage of the predetermined data, and perform a process corresponding to the instruction by writing the predetermined data to the determined storage device or by reading the predetermined data from the determined storage device, and wherein the multiple storage devices include at least two of multiple different types of permanent storage devices and multiple different types of volatile storage devices.

The program may include an ID creator for creating a data ID by observing the predetermined data and by generating a pattern.

The program may further include a statistical analyzer for analyzing usage of the predetermined data by observing usage of the predetermined data and by tracking the data ID.

The program may further include an intelligent guider for performing iterative learning based on a relationship between data usage and the storage location, and the intelligent guider may establish a policy based on a result learned in analysis of the observed data usage and provide a notification of a result of selecting a storage location in conformity with the policy.

The program may further include a storage mapper for determining one of the multiple storage devices depending on the notification of the result of selecting the storage location.

The program may further include a storage manager for accessing the determined storage device so as to perform the process corresponding to the instruction, and the storage manager may manage at least one of an address of an actual storage location of each of the multiple storage devices, a physical status of each of the multiple storage devices, and a usage amount of each of the multiple storage devices.

The program may be configured to, when the instruction is a write request by which a location of a storage device is designated by the user, analyze whether the designated storage device is suitable for usage of the predetermined data, and when the storage device is found not to be suitable for usage of the predetermined data, select an additional storage device and store the predetermined data in the selected storage device.

The program may be configured to, when the instruction is a read request by which a location of a storage device is designated by the user, check whether the designated storage device is a location of the storage device in which the predetermined data is actually stored, and read the predetermined data from a storage device corresponding to a location at which the data is actually stored.

In accordance with another aspect, there is provided a method for selecting a storage location based on data usage, including, when an instruction for predetermined data is input through a user interface, analyzing usage of the predetermined data, determining one of multiple storage devices based on a result of analysis of the usage, and performing a process corresponding to the instruction by writing the predetermined data to the determined storage device or by reading the predetermined data from the determined storage device, wherein the multiple storage devices include at least two of multiple different types of permanent storage devices and multiple different types of volatile storage devices.

Analyzing the usage may include creating a data ID by observing the predetermined data and generating a pattern.

Analyzing the usage may further include statistically analyzing usage of the predetermined data by observing usage of the predetermined data and tracking the data ID.

Determining one of the multiple storage devices may include establishing a policy based on a result learned in analysis of the observed data usage, and providing a notification of a result of selecting a storage location in conformity with the policy, and determining one of the multiple storage devices depending on the notification of the result of selecting the storage location.

Each of the multiple storage devices may be configured such that at least one of an address of an actual storage location, a physical status, and a usage amount of the corresponding storage device is managed.

Determining one of the multiple storage devices may include, when the instruction is a write request by which a location of a storage device is designated by the user, analyzing whether the designated storage device is suitable for usage of the predetermined data, and when the storage device is found not to be suitable for usage of the predetermined data, selecting an additional storage device.

Determining one of the multiple storage devices may include, when the instruction is a read request by which a location of a storage device is designated by the user, checking whether the designated storage device is a location of the storage device in which the predetermined data is actually stored, and determining a storage device corresponding to a location at which the data is actually stored.

In accordance with a further aspect, there is provided an apparatus for selecting a storage location based on data usage, including memory for storing at least one program, and a processor for executing the program, wherein the program includes an ID creator for, when an instruction for predetermined data is input through a user interface, creating a data ID by observing the predetermined data and by generating a pattern, a statistical analyzer for analyzing usage of the predetermined data by observing usage of the predetermined data and by tracking the data ID, an intelligent guider for establishing a policy based on a result learned in analysis of the observed data usage and providing a notification of a result of selecting a storage location in conformity with the policy, a storage mapper for determining one of multiple storage devices depending on notification of the result of selecting the storage location, and a storage manager for accessing the determined storage device so as to perform a process corresponding to the instruction, wherein the multiple storage devices include at least two of multiple different types of permanent storage devices and multiple different types of volatile storage devices.

The intelligent guider may perform iterative learning based on a relationship between data usage and the storage location.

The storage manager may manage at least one of an address of a real storage location of each of the multiple storage devices, a physical status of each of the multiple storage devices, and a usage amount of each of the multiple storage devices.

The program may be configured to, when the instruction is a write request by which a location of a storage device is designated by the user, analyze whether the designated storage device is suitable for usage of the predetermined data, and when the storage device is found not to be suitable for usage of the predetermined data, select an additional storage device and store the predetermined data in the selected storage device.

The program may be configured to, when the instruction is a read request by which a location of a storage device is designated by the user, check whether the designated storage device is a location of the storage device in which the predetermined data is actually stored, and read the predetermined data from a storage device corresponding to a location at which the data is actually stored.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
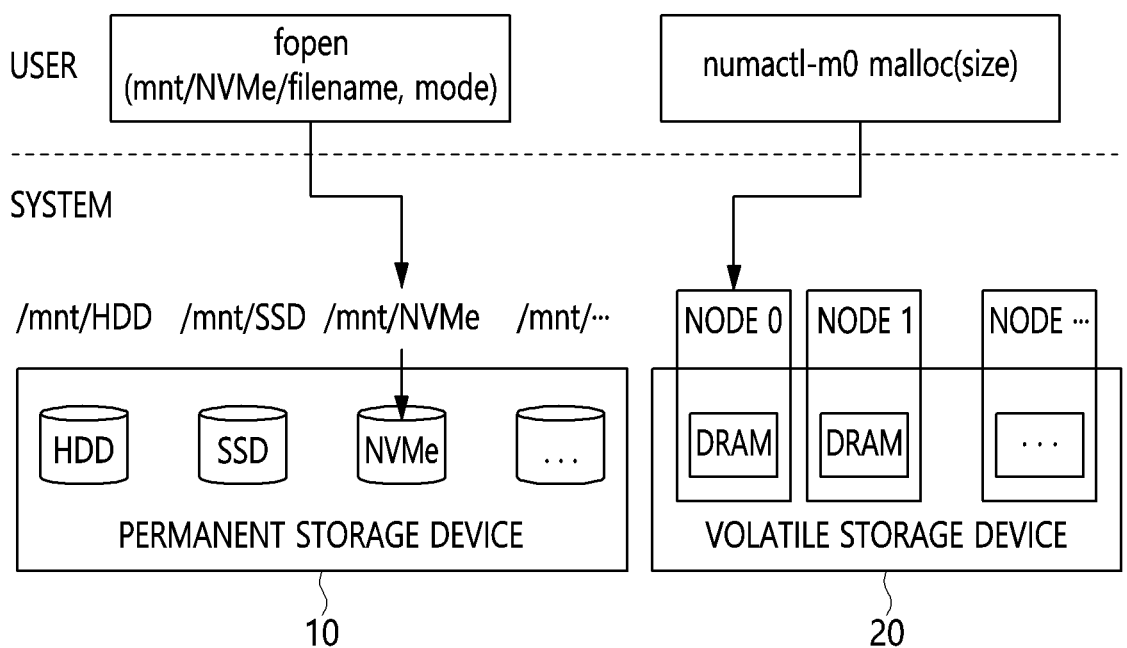
FIG. 1 is a diagram illustrating an example of usage of a conventional storage device having various types of performance characteristics.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for selecting a storage location based on data usage according to embodiments will be described in detail with reference to FIGS. 1 to 9.

FIG. 1 is a diagram illustrating an example of usage of a conventional storage device having various performance characteristics.

Referring to FIG. 1, in a typical system, a permanent (i.e., nonvolatile) storage device 10 or a volatile storage device 20 is selected through intervention by a user.

The permanent storage device 10 is a storage device in which stored data is retained regardless of whether the supply of power is interrupted, and is mainly used for file storage, such as in a Hard Disk Drive (HDD), an optical storage device, a solid-state drive (SSD), and Nonvolatile Memory express (NVMe).

The volatile storage device 20 may be a storage device which rapidly stores data in the state in which the supply of power is maintained, and may include, for example, Dynamic Random Access Memory (DRAM).

A conventional system identifies the use of storage devices so that, when a memory usage interface is used, the volatile storage device is used, and when a file-processing interface is used, the permanent storage device is used.

When the user selects a RAM disk, which uses the file-processing interface, in the volatile storage device 20, fast processing of file data is possible owing to the performance characteristics of the storage device. However, in this process, the selection of a storage location by the user is essentially required. Because the performance characteristics of the storage device influence data-processing performance, a problem may arise in that the selection of a storage location by the user is the principal factor determining system performance.

In an embodiment, storage devices having various performance characteristics are selected so as to suit data usage, and thus data usage efficiency may be increased, and processing performance may be improved.

Figure 2:
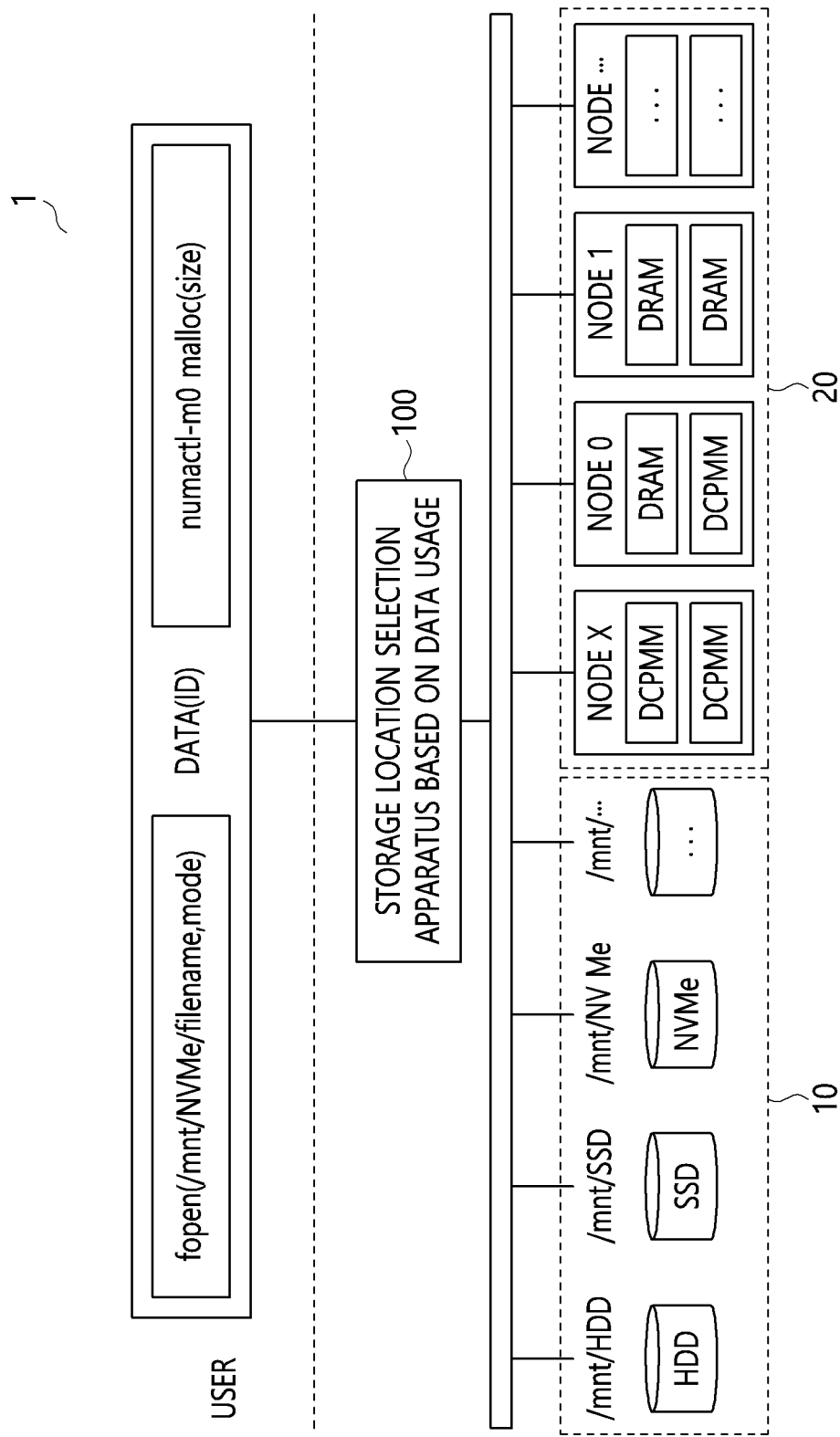
FIG. 2 is a schematic configuration diagram of a computing system including an apparatus for selecting a storage location based on data usage according to an embodiment.
Figure 3:
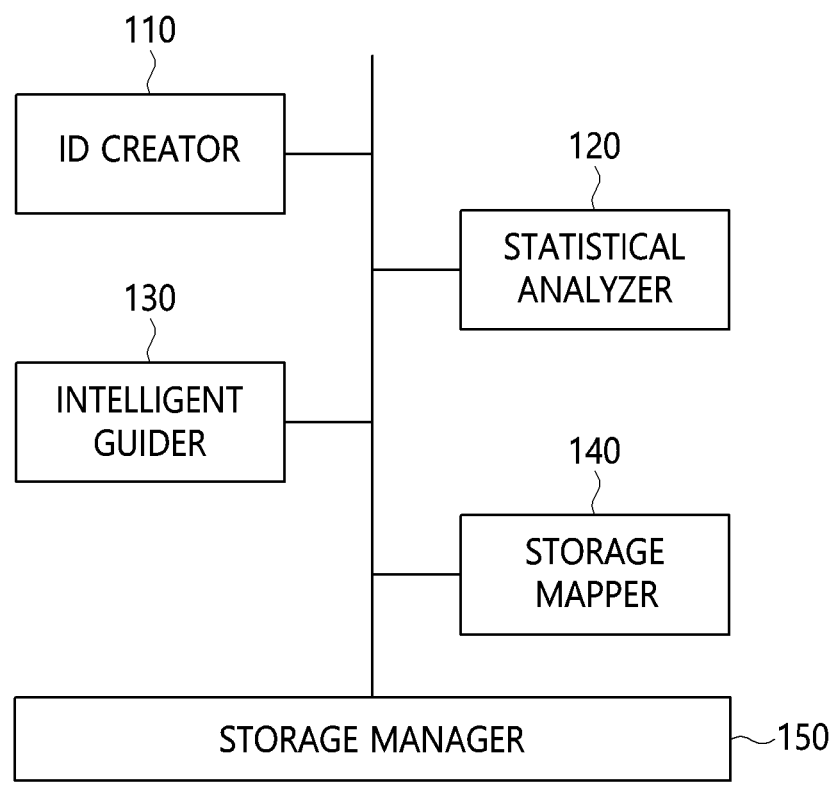
FIG. 3 is a schematic block diagram illustrating the internal configuration of an apparatus for selecting a storage location based on data usage according to an embodiment.
Figure 4:
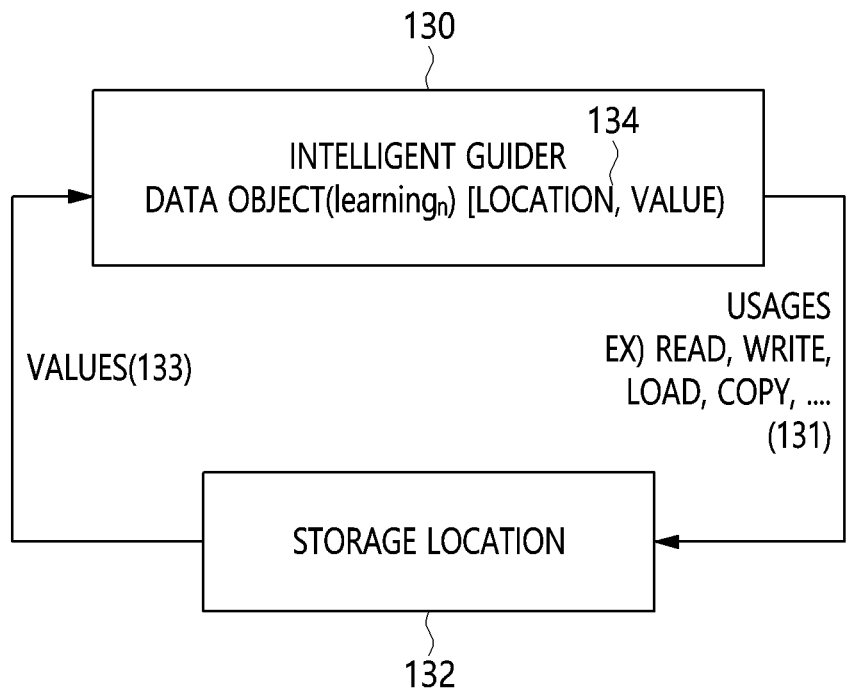
FIG. 4 is a diagram illustrating an example of a learning process by an intelligent guider according to an embodiment.
Figure 5:
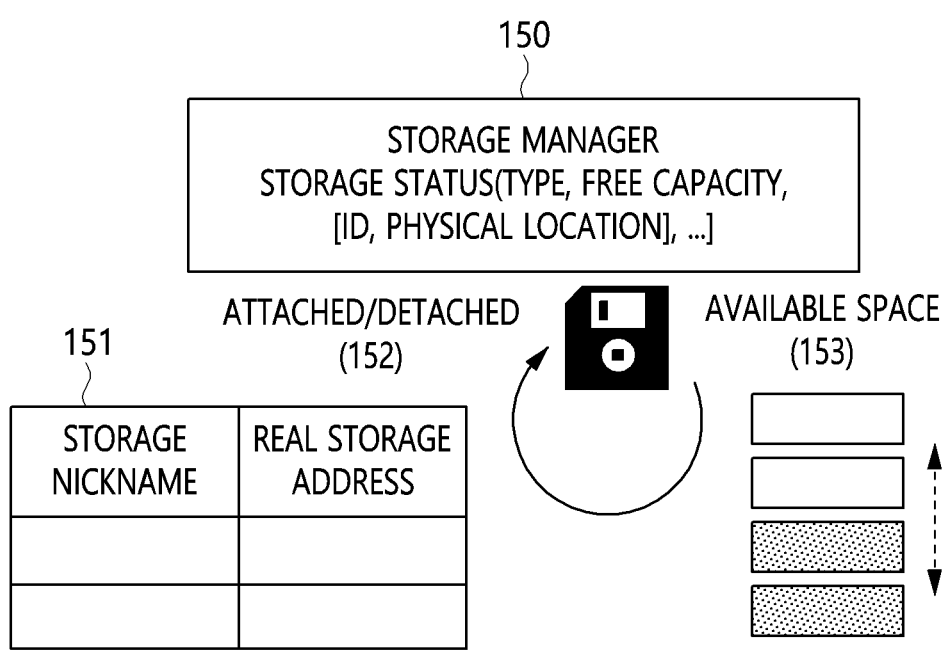
FIG. 5 is a diagram illustrating a management operation performed by a storage manager according to an embodiment.

FIG. 2 is a schematic configuration diagram of a computing system including an apparatus for selecting a storage location based on data usage according to an embodiment, FIG. 3 is a schematic block diagram illustrating the internal configuration of an apparatus for selecting a storage location based on data usage according to an embodiment, FIG. 4 is a diagram illustrating an example of a learning process by an intelligent guider according to an embodiment, and FIG. 5 is a diagram illustrating a management operation performed by a storage manager according to an embodiment.

Referring to FIG. 2, an apparatus 100 for selecting a storage location based on data usage (hereinafter referred to as a 'selection apparatus 100') is located between a user interface 1 and multiple storage devices 10 and 20 according to an embodiment.

Here, the multiple storage devices 10 and 20 may include at least two of multiple different types of permanent (nonvolatile) storage devices 10 and multiple different types of volatile storage devices 20.

When an instruction for predetermined data is input through the user interface 1, the selection apparatus 100 according to the embodiment may determine one of the multiple storage devices 10 and 20 based on the result of analysis of usage of the corresponding data, and may perform a process corresponding to the instruction by writing the corresponding data to the determined storage device or reading the corresponding data from the determined storage device.

In detail, referring to FIG. 3, the selection apparatus 100 may include an ID creator 110, a statistical analyzer 120, an intelligent guider 130, a storage mapper 140, and a storage manager 150.

Here, the ID creator 110 may create a data ID by observing data, processing of which is requested by a user, and generating a pattern.

Here, the statistical analyzer 120 may analyze usage of the data, processing of which is requested by a user, by observing usage of the data, processing of which is requested, and tracking the data ID.

The intelligent guider 130 may establish a policy based on results learned in the analysis of usage of the observed data, and may provide notification of the results of selection of a storage location in conformity the policy.

For this operation, the intelligent guider 130 may perform iterative learning based on relationships between data usage and storage locations.

That is, referring to FIG. 4, the intelligent guider 130 performs iterative learning based on values 133 obtained through the relationship between data usage 131 and a storage location 132. Here, the types of data usage may include at least one of a read operation, a write operation, a load operation, and a copy operation.

Further, the intelligent guider 130 memorizes content, for example, a data object (learning$_n$)[location, value].

Referring back to FIG. 3, the storage mapper 140 may determine one of the multiple storage devices 10 and 20 depending on the notification of the results of selecting the storage location.

The storage manager 150 may access the determined storage device so as to perform a process corresponding to the instruction.

For this operation, as illustrated in FIG. 5, the storage manager 150 may manage at least one of a storage nickname and actual storage location address (or real storage address) 151 corresponding to each of the multiple storage devices 10 and 20, physical status 152, such as an attached or detached state of each of the multiple storage devices 10 and 20, and an available space (capacity) 153 in each of the multiple storage devices 10 and 20.

Through interworking between the above-described components 110 to 150, the selection apparatus 100 may execute various instructions requested by the user.

Here, the instructions may include processes of reading data from one of the storage devices 10 and 20 and thereafter processing the read data, or processes of writing data requested by the user to one of the storage devices 10 and 20.

Here, when the instruction is a write request by which the location of the storage device is designated by the user, the selection apparatus 100 may analyze whether the designated storage device is suitable for predetermined data usage, and when the storage device is not suitable for the predetermined data usage, may select another storage device and store the predetermined data in the selected storage device.

Here, when the instruction is a read request by which the location of the storage device is designated by the user, the selection apparatus 100 may check whether the designated storage device is the location of a storage device in which the predetermined data is actually stored, and may read the corresponding data from the storage device corresponding to the location at which the data is actually stored.

Next, an example of execution of the instruction by the selection apparatus 100 will be described below with reference to FIGS. 6 and 7.

Figure 6:
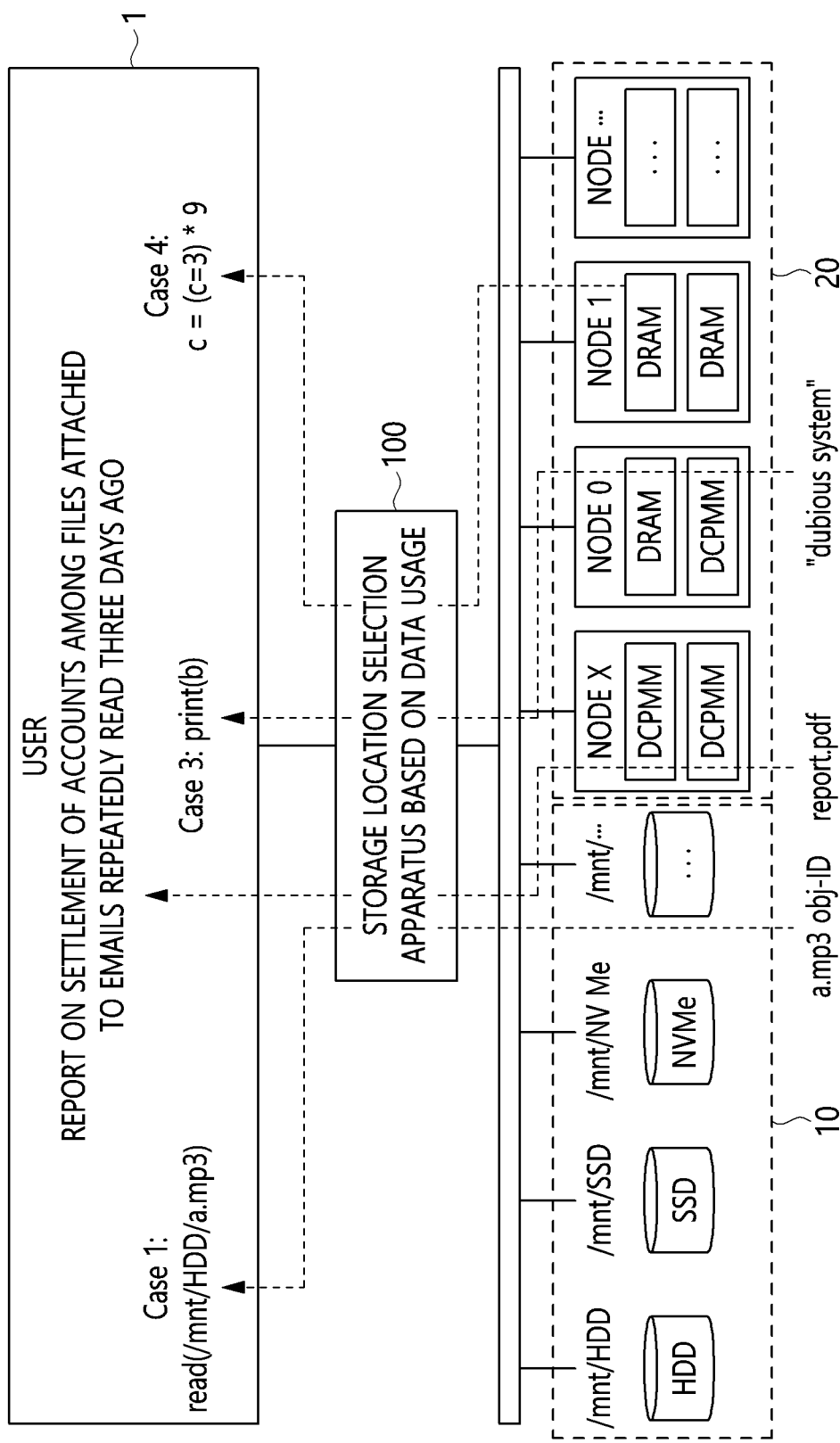
FIG. 6 is a diagram illustrating various examples of a data read operation performed by the apparatus for selecting a storage location based on data usage according to an embodiment.

FIG. 6 is a diagram illustrating various examples of a data read operation performed by the apparatus for selecting a storage location based on data usage according to an embodiment.

Referring to FIG. 6, illustrated is a first case (Case 1) in which, if a request by which a storage location and a file name are designated, that is, 'read(/mnt/HDD/a.mp3)' is input by the user, the selection apparatus 100 finds the location of the storage device in which the corresponding file is actually stored, reads the corresponding file from the found storage device, and provides the read file to the user.

Further, in a second case (Case 2), if a file name that does not follow a formalized format, such as 'a report on the settlement of accounts, among files attached to emails repeatedly read three days ago' is input by the user, the selection apparatus 100 reads the corresponding file from a storage device in which the corresponding file is stored based on content learned during the process for analyzing data usage, and provides the read file to the user.

Furthermore, in a third case (Case 3) and a fourth case (Case 4), in response to a user request to print or copy a predetermined file, the selection apparatus 100 finds the storage device in which the corresponding file is stored, reads the corresponding file from the storage device, and provides the read file to the user.

Figure 7:
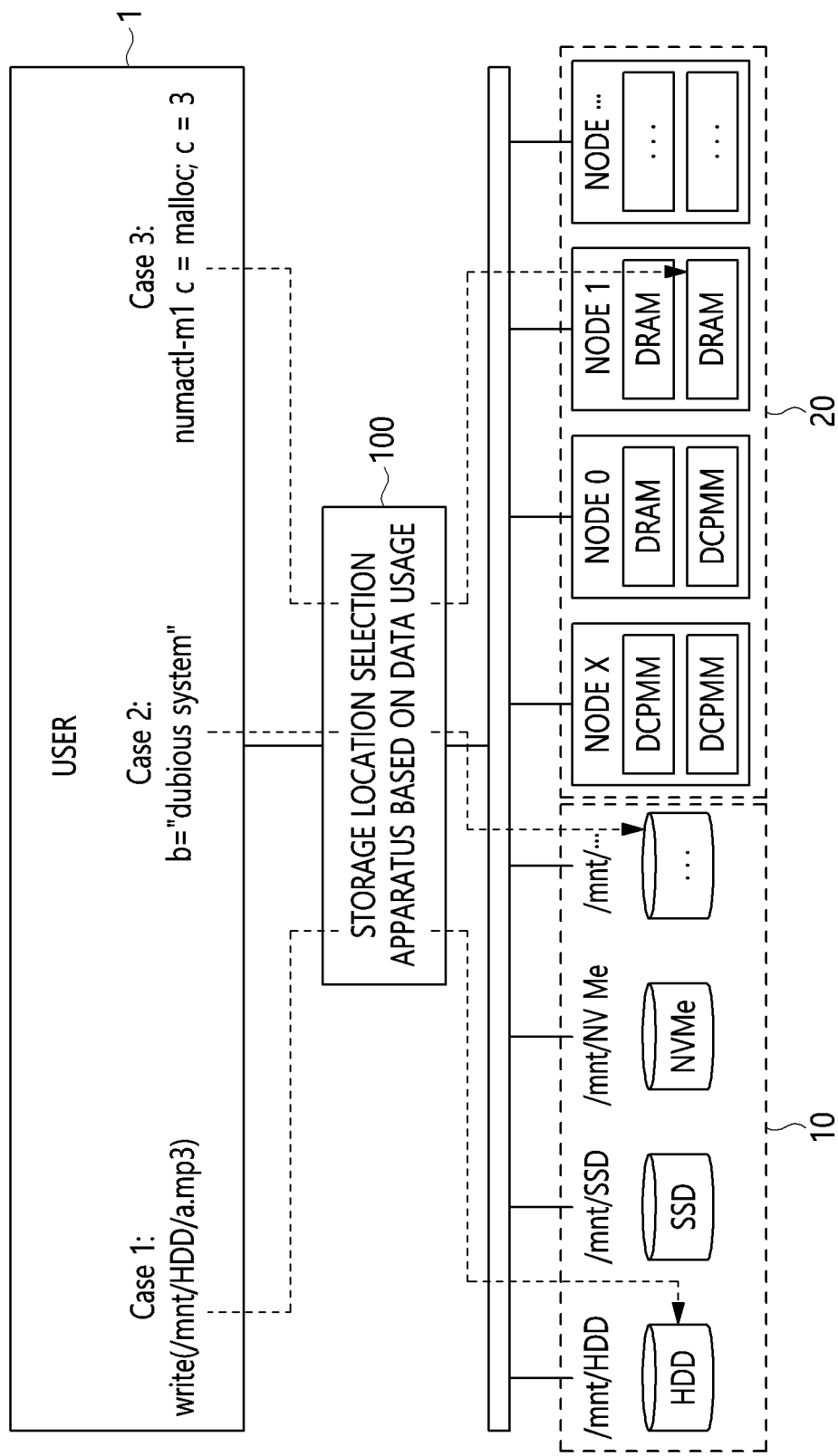
FIG. 7 is a diagram illustrating various examples of a data write operation by the apparatus for selecting a storage location based on data usage according to an embodiment.

FIG. 7 is a diagram illustrating various examples of a data write operation by the apparatus for selecting a storage location based on usage storage according to an embodiment.

Referring to FIG. 7, in a first case (Case 1), when a request designating a storage location and a file name, that is, 'write(/mnt/HDD/a.mp3)', is input by the user, the selection apparatus 100 may select a storage device at a designated location and store the corresponding file in the storage device.

Further, in a second case (Case 2), when usage of memory is requested by the user, the selection apparatus 100 selects a storage device in which the corresponding file is to be stored based on content learned during the process for analyzing usage of data, and stores the corresponding file in the storage device.

Furthermore, in a third case (Case 3), even if it is requested to use memory in #1 node from the user, the selection apparatus 100 may select another node (#0 node) as a storage location when no storage device having characteristics suitable for usage is present in the corresponding node.

Figure 8:
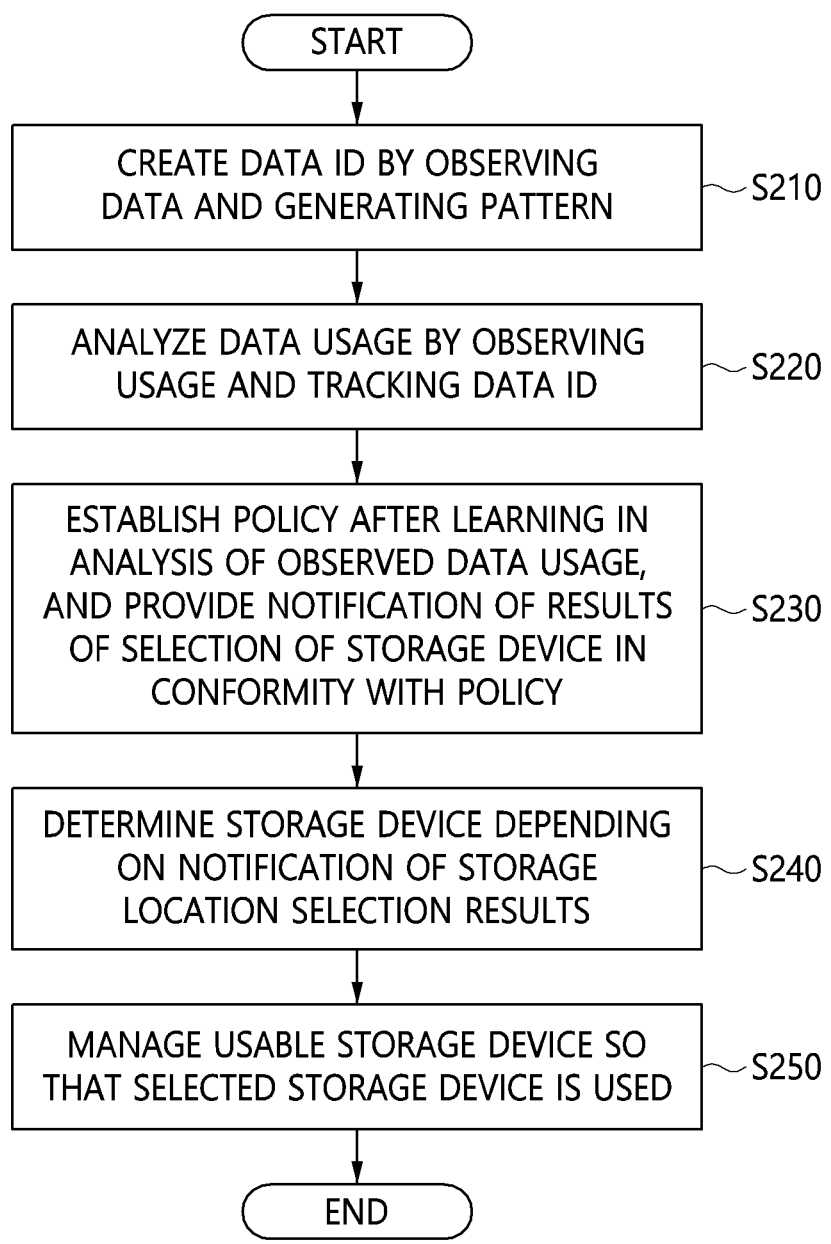
FIG. 8 is a flowchart illustrating a method for selecting a storage location based on data usage according to an embodiment.

FIG. 8 is a flowchart illustrating a method for selecting a storage location based on data usage according to an embodiment.

Referring to FIG. 8, the method for selecting a storage location based on data usage according to the present embodiment may include steps S210 and S220 of, when an instruction for predetermined data is input through a user interface, analyzing usage of the corresponding data, steps S230 and S240 of determining one of multiple storage devices based on the results of analysis of the usage, and step S250 of performing a process corresponding to the instruction by writing the corresponding data to the determined storage device, or reading the corresponding data from the determined storage device.

Here, the multiple storage devices may include at least two of multiple different types of permanent storage devices and multiple different types of volatile storage devices.

Here, analyzing steps S210 and S220 may include step S210 of creating a data ID by observing predetermined data and generating a pattern and step S220 of statistically analyzing usage of the predetermined data by observing usage of the predetermined data and tracking the data ID.

Here, determination steps S230 and S240 may include step S230 of establishing a policy based on results learned in the analysis of usage of the predetermined data and providing notification of the results of selecting a storage location in conformity with the policy, and step S240 of determining one of multiple storage devices depending on the notification of the results of selecting the storage location.

Here, the determination steps S230 and S240 may include, when the instruction is a write request by which the location of the storage device is designated by the user, analyzing whether the designated storage device is suitable for usage of predetermined data, and when the storage device is found not to be suitable for usage of the predetermined data, selecting another storage device.

Here, the determination steps S230 and S240 may include, when the instruction is a read request by which the location of a storage device is designated by the user, checking whether the designated storage device is the location of the storage device in which the predetermined data is actually stored, and determining a storage device corresponding to the location at which the data is actually stored.

Figure 9:
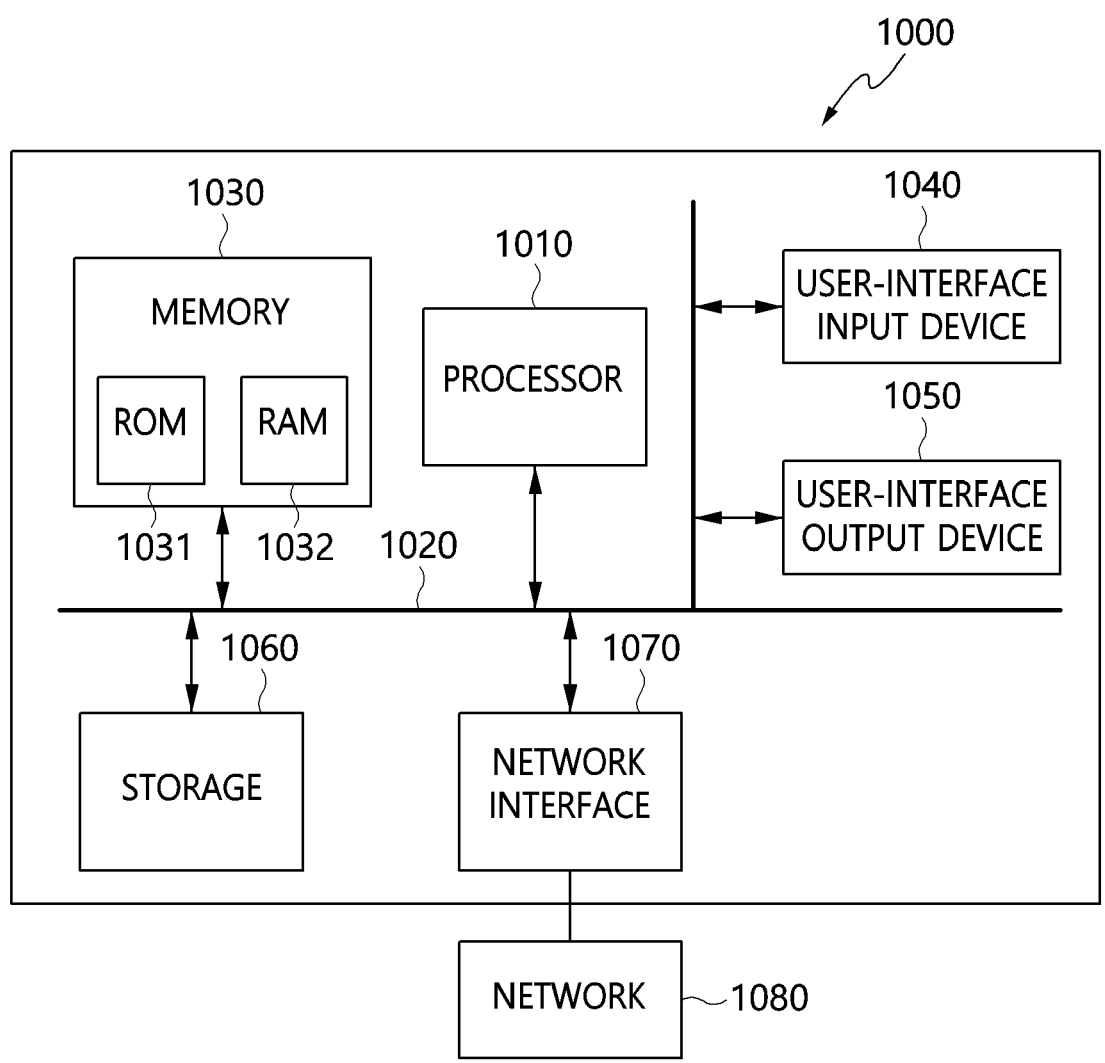
FIG. 9 is a diagram illustrating the configuration of a computer system according to an embodiment.

FIG. 9 is a diagram illustrating the configuration of a computer system according to an embodiment.

A system including an apparatus for selecting a storage location based on data usage according to an embodiment may be implemented in a computer system, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with the embodiments, a storage location is dynamically selected depending on the characteristics of data desired to be stored, and thus a storage device suitable for a usage pattern may be used, with the result that data usage efficiency may be improved and processing performance may be enhanced.

In accordance with the embodiments, a user does not need to be concerned with a complicated process for usage of storage spaces that are physically separated, and convenience can be provided in that storage devices may be used in the same manner as a conventional scheme, regardless of the physical difference between storage locations.

In accordance with the embodiments, there is an advantage in that a user can more rapidly extract and utilize storage content by managing storage content through interference and learning based on a usage pattern.

In accordance with the embodiments, there is an advantage in that stored information may be selected and used through various schemes.

In accordance with the embodiments, there is an advantage in that the storage location of a storage target may be changed depending on data usage and the status of storage space, or a storage target may be modified and newly stored, and this process may also be performed through an autonomous learning process, without requiring a user's explicit intervention, thus allowing the user to utilize a storage target, without actively intervening in usage of a new storage device.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for selecting a storage location based on data usage, comprising:
    a memory for storing at least one program; and
    a processor for executing the program, wherein
    in response to an instruction for predetermined data being input through a user interface, the program is configured to determine one of multiple storage devices based on a result of analysis of usage of the predetermined data,
    the multiple storage devices comprise at least two of multiple different types of storage devices including permanent storage devices and volatile storage devices, and
    in response to the user designating a preferred storage device for the predetermined data, the program performs a process corresponding to the instruction by writing the predetermined data to the preferred storage device or by reading the predetermined data from the preferred storage device in response to the preferred storage device being suitable for the predetermined data; otherwise, the program performs a process corresponding to the instruction by automatically writing the predetermined data to the storage device determined by the program or by automatically reading the predetermined data from the storage device determined by the program,
    wherein the types of data usage include at least one of a read operation, a write operation, a load operation, and a copy operation, and
    wherein the program comprises:
        an ID creator for creating a data ID by observing the predetermined data and by generating a pattern; and
        a statistical analyzer for analyzing usage of the predetermined data by observing usage of the predetermined data and by tracking the data ID.

2. The apparatus of claim 1, wherein the program further comprises:
    an intelligent guider for performing iterative learning based on a relationship between data usage and the storage location, and
    wherein the intelligent guider establishes a policy based on a result learned in analysis of the observed data usage and provides a notification of a result of selecting a storage location in conformity with the policy.

3. The apparatus of claim 2, wherein the program further comprises:
    a storage mapper for determining one of the multiple storage devices depending on the notification of the result of selecting the storage location.

4. The apparatus of claim 2, wherein the program further comprises:
    a storage manager for accessing the determined storage device so as to perform the process corresponding to the instruction, and
    wherein the storage manager manages at least one of an address of an actual storage location of each of the multiple storage devices, a physical status of each of the multiple storage devices, and a usage amount of each of the multiple storage devices.

5. The apparatus of claim 1, wherein the program is configured to, when the instruction is a write request by which a location of a storage device is designated by the user, analyze whether the designated storage device is suitable for usage of the predetermined data, and when the storage device is found not to be suitable for usage of the predetermined data, select an additional storage device and store the predetermined data in the selected storage device.

6. The apparatus of claim 1, wherein the program is configured to, when the instruction is a read request by which a location of a storage device is designated by the user, check whether the designated storage device is a location of the storage device in which the predetermined data is actually stored, and read the predetermined data from a storage device corresponding to a location at which the data is actually stored.

7. A method for selecting a storage location based on data usage, comprising:
    in response to an instruction for predetermined data is input through a user interface, analyzing usage of the predetermined data;
    determining one of multiple storage devices based on a result of analysis of the usage; and
    performing a process corresponding to the instruction by writing the predetermined data by reading the predetermined data, wherein
    the multiple storage devices comprise at least two of multiple different types of permanent storage devices and multiple different types of volatile storage devices, and
    in response to a user designating a preferred storage device for the predetermined data, the program performs a process corresponding to the instruction by reading the predetermined data from the preferred storage device in response to the preferred storage device being suitable for the predetermined data; otherwise, the program performs a process corresponding to the instruction by automatically reading the predetermined data from the storage device determined by the program,
    wherein the types of data usage include at least one of a read operation, a write operation, a load operation, and a copy operation, and
    wherein analyzing the usage comprises:

creating a data ID by observing predetermined data and by generating a pattern; and
statistically analyzing usage of the predetermined data by observing usage of the predetermined data and by tracking the data ID.

8. The method of claim 7, wherein determining one of the multiple storage devices comprises:
establishing a policy based on a result learned in analysis of the observed data usage, and providing a notification of a result of selecting a storage location in conformity with the policy; and
determining one of the multiple storage devices depending on the notification of the result of selecting the storage location.

9. The method of claim 7, wherein each of the multiple storage devices is configured such that at least one of an address of an actual storage location, a physical status, and a usage amount of the corresponding storage device is managed.

10. The method of claim 7, wherein determining one of the multiple storage devices comprises:
when the instruction is a write request by which a location of a storage device is designated by the user, analyzing whether the designated storage device is suitable for usage of the predetermined data, and when the storage device is found not to be suitable for usage of the predetermined data, selecting an additional storage device.

11. The method of claim 7, wherein determining one of the multiple storage devices comprises:
when the instruction is a read request by which a location of a storage device is designated by the user, checking whether the designated storage device is a location of the storage device in which the predetermined data is actually stored, and determining a storage device corresponding to a location at which the data is actually stored.

12. An apparatus for selecting a storage location based on data usage, comprising:
a memory for storing at least one program; and
a processor for executing the program,
wherein the program comprises:
an ID creator for, when an instruction for predetermined data is input through a user interface, creating a data ID by observing the predetermined data and by generating a pattern;
a statistical analyzer for analyzing usage of the predetermined data by observing usage of the predetermined data and by tracking the data ID;
an intelligent guider for establishing a policy based on a result learned in analysis of the observed data usage and providing a notification of a result of selecting a storage location in conformity with the policy;
a storage mapper for determining one of multiple storage devices depending on notification of the result of selecting the storage location; and
a storage manager for accessing the determined storage device so as to perform a process corresponding to the instruction, wherein the multiple storage devices comprise at least two of multiple different types of permanent storage devices and multiple different types of volatile storage devices,
wherein in response to a user designating a preferred storage device for the predetermined data, the program performs a process corresponding to the instruction by writing the predetermined data to the preferred storage device or by reading the predetermined data from the preferred storage device in response to the preferred storage device being suitable for the predetermined data; otherwise, the program performs a process corresponding to the instruction by automatically writing the predetermined data to the storage device determined by the program or by automatically reading the predetermined data from the storage device determined by the program, and
wherein the types of data usage include of a read operation, a write operation, a load operation, and a copy operation.

13. The apparatus of claim 12, wherein the intelligent guider performs iterative learning based on a relationship between data usage and the storage location.

14. The apparatus of claim 12, wherein the storage manager manages at least one of an address of a real storage location of each of the multiple storage devices, a physical status of each of the multiple storage devices, and a usage amount of each of the multiple storage devices.

15. The apparatus of claim 12, wherein the program is configured to, when the instruction is a write request by which a location of a storage device is designated by the user, analyze whether the designated storage device is suitable for usage of the predetermined data, and when the storage device is found not to be suitable for usage of the predetermined data, select an additional storage device and store the predetermined data in the selected storage device.

16. The apparatus of claim 12, wherein the program is configured to, when the instruction is a read request by which a location of a storage device is designated by the user, check whether the designated storage device is a location of the storage device in which the predetermined data is actually stored, and read the predetermined data from a storage device corresponding to a location at which the data is actually stored.

* * * * *